United States Patent [19]

Mills

[11] 4,451,604

[45] May 29, 1984

[54] STABILIZED POLYOLEFIN COMPOSITIONS

[75] Inventor: Kenneth R. Mills, Bartlesville, Okla.

[73] Assignee: Phillips Petroleum Company, Bartlesville, Okla.

[21] Appl. No.: 433,751

[22] Filed: Oct. 8, 1982

Related U.S. Application Data

[63] Continuation-in-part of Ser. No. 264,530, May 18, 1981, abandoned.

[51] Int. Cl.³ .................. C08K 5/10; C08L 5/13; C08L 23/04; C08L 23/10
[52] U.S. Cl. ............................ 524/312; 524/313; 524/336; 524/349; 524/350; 524/351; 524/570; 524/579; 524/583; 524/585
[58] Field of Search .............. 252/182, 399, 407; 106/13; 524/312, 313, 336, 349, 351, 570, 579, 583, 585, 350; 523/100

[56] References Cited

U.S. PATENT DOCUMENTS

| | | | |
|---|---|---|---|
| 2,827,445 | 3/1958 | Bartolomeo et al. | 528/481 |
| 3,048,263 | 8/1962 | Sacks et al. | 106/13 |
| 3,222,304 | 12/1965 | Ingram | 521/95 |
| 3,412,057 | 11/1968 | Fujitani | 524/312 |
| 3,574,156 | 4/1971 | Wagner et al. | 524/317 |
| 3,887,494 | 6/1975 | Dietz | 526/96 |
| 3,922,249 | 11/1975 | Mills | 524/120 |
| 4,144,214 | 3/1979 | Corbacella | 523/101 |
| 4,268,583 | 5/1981 | Hendy | 524/583 |

FOREIGN PATENT DOCUMENTS

| | | | |
|---|---|---|---|
| 739488 | 3/1970 | Belgium | 260/DIG. 19 |
| 42-4271 | 2/1967 | Japan | 523/100 |
| 54-69154 | 6/1979 | Japan | 260/DIG. 19 |

*Primary Examiner*—Ronald W. Griffin

[57] ABSTRACT

Glycerides of higher fatty acids have been found to be effective as a discoloration inhibitor in very low concentrations for polyolefins.

11 Claims, No Drawings

STABILIZED POLYOLEFIN COMPOSITIONS

This application is a continuation-in-part of application Ser. No. 264,530, filed May 18, 1981 now abandoned.

BACKGROUND OF THE INVENTION

Many compositions have been suggested in the art to be added to polyolefin materials. Typical additives are antistatic agents, antioxidants, UV stabilizers, fillers, plasticizers, colorants, thermal stabilizers, antifog agents, slip agents, antiblocking agents, flame retardants, etc. Many of these agents have effects on each other, sometimes desired effects, sometimes detrimental effects. To establish a recipe for a polymer composition to achieve specified goals is a fine art and often times involves inventive activities.

Monoglycerides and diglycerides of fatty acids have been described in the art as antifog agents for polyolefin films. Thus U.S. Pat. No. 3,048,263, for instance, describes the addition of 0.05 weight percent or more of these glycerides an antifog agents for polyethylene film. The patent also points out that the use of less than about 0.05 weight percent does not result in any appreciable improvement in the antifog properties of the films.

Mono- and diglycerides are also described in U.S. Pat. No. 3,922,249 an antistatic agents for polyolefins. Hindered phenols are furthermore described as well known thermal stabilizers for polyolefins.

THE INVENTION

Polyolefins are employed for various purposes and the molding techniques usually involve the exposure of these polymers to relatively high temperatures. One of the problems occurring in such procedures is the discoloration of the polymers under processing temperatures and/or the aging. Particularly ethylene polymer compositions have been found to be subject to discoloration at elevated temperatures.

It is thus one object of this invention to provide a polyolefin composition that is stabilized against discoloration effects.

Another object of this invention is to provide polyolefin compositions which can be employed with foodstuffs which are discoloration resistant.

A still further object of this invention is to stabilize specific olefin polymers and copolymers resulting from a specified catalytic polymerization process against discoloration.

These and other objects, advantages, details, features and embodiments of this invention will become apparent to those skilled in the art from the following detailed description of the invention and the appended claims.

In accordance with this invention it has been found that 1-olefin polymer or copolymer compositions containing a hindered phenol as the stabilizer can be improved by reducing discoloration effects by incorporating a very small quantity of a glyceride of a fatty acid into the polyolefin composition. More specifically, in accordance with a first embodiment of this invention a polyolefin composition is provided which comprises 100 parts by weight of a polyolefin, 0.002 to 0.2 parts by weight of a phenolic stabilizer and 0.001 to less than 0.05 parts by weight of one or more gycerides of a higher fatty acid. This range corresponds to a weight ratio of phenolic stabilizer to glyceride(s) of 200:1 to 0.04:1.

The incorporation of the small amount of one or more glycerides of a fatty acid has been found to result in a stabilized composition having reduced discoloration when the composition is processed at elevated temperatures as compared to a composition containing no such glyceride. The composition in accordance with this invention in addition to the hindered phenol as the primary stabilizer may also contain a secondary stabilizer such as dilauryl thiodipropionate.

In accordance with the most preferred variation of this embodiment of this invention the composition does not contain an organic phosphite such as pentaerythritol diphosphite. Although this composition has been found to reduce discoloration, experience has now indicated that such a composition can degrade during the processing and can thus contribute to such other problems in the polymer composition as black specks. These effects are particularly undesirable when the polyolefin is used in contact and in connection with foodstuffs. Very advantageously it has been found that the discoloration prevention in accordance with this invention is achieved with a glyceride of a fatty acid, a composition which is not only compatible with foodstuffs but is in fact a composition which is permitted as an additive to foodstuffs.

The polymer compositions of this invention are particularly useful for the manufacture of film and for the production of molded articles.

POLYOLEFIN

In accordance with this invention polymers made of one or more alpha-olefins can be utilized. Examples for such polyolefins are polyethylene, polypropylene, copolymers of ethylene with up to 10 percent of 1-butene, 1-hexene and 1, 3-butadiene, poly-1 butene, poly-4-methyl-1-pentene, and mixtures thereof. The polyolefins used in this invention are preferably polymers of one or more alpha-olefins having 2 to 8 carbon atoms per molecule. The presently preferred polyolefin for the composition of this invention is an ethylene polymer having 0 to 10 and preferably 0 to 5 molecular percent of comonomer selected from the group of olefins of 3 to 8 carbon atoms incorporated into the polymer molecule. The molecular weight of these preferred ethylene polymers is usually in the range of about 30,000 to about 1,000,000 (weight average molecular weight). The preferred polymers are normally solid polymers containing 90 to 100 mole % polymerized ethylene.

It is presently believed that the discoloration problems are particularly severe with polymers containing up to about 10 ppm titanium as a catalyst residue and up to about 5 ppm chromium. Typically the polymers will contain from about 1 to about 10 ppm titanium and from about 0.5 to 5 ppm of chromium. Typically the polymers envisaged in the composition of this invention will contain about 5 ppm titanium which is presently believed to react with the hindered phenol that is incorporated as a stabilizing agent at the elevated temperature and about 3 ppm chromium. This effect in particular is believed to be avoided by the composition of the present invention.

The titanium and chromium present in the polyolefin of the composition of this invention may be present as a catalyst residue, particularly as a residue from a high productivity catalyst. For example, polyethylene or copolymers of ethylene and aliphatic mono-1-olefins containing 3 to about 8 carbon atoms can be effectively made with a supported chromium oxide catalyst; in particular, a catalyst of chromium oxide supported on a silica-titania cogel carrier is a well known catalyst of desirable properties for the production of such polymers. The cogel contributes some titanium to the polyolefin recovered. The catalyst referred to is described in more detail together with the polymerization process in the U.S. Pat. No. 3,887,494. Another source of titanium in the polymer may be a high productivity coordination catalyst based on Ti and, e.g., Mg. Such catalysts are also well known in the art; their productivity is in some instances high enough that all the catalyst is left in the final polymer product.

GLYCERIDES

In accordance with this invention glycerides, including monoglycerides, as well as diglycerides and triglycerides and mixtures thereof of fatty acids can be used as the discoloration stabilizer. Such glycerides are products obtained from the glycerolysis of natural fats or oils such as beef tallow, butter fat, coconut oil, corn oil, olive oil, soy bean oil, and mixtures thereof. Other examples of the glycerides and diglycerides useful for the purposes of this invention are synthetic glycerides such as glycerol monostearate, (commonly available as Atmos 84 from ICI of America Inc., Atmos 84 has a HLB of 3.8), glycerol monolaurate, glycerol monococoate, glycerol dioleate, glycerol monomyristate glycerol monopalmitate, glycerol dipalmitate, glycerol distearate, etc. Generally, the mono- and diglycerides of saturated fatty acids are preferred because they are normally solid. One such composition is glycerol monostearate. Other examples include the mono- and diglycerides of edible fats having a hydrophile-lipophile balance (HLB) of about 3.2, available commercially as Atmos 150, a product of ICI America, Inc., Wilmington, Del. The fatty acids usually have 10-30 C-atoms per molecule.

The glycerides are employed in accordance with this invention in quantities based on 100 parts by weight of the polymer which are in the range of 0.001 to less than 0.05 parts by weight. This very low concentration of glycerides results in a very significant improvement of the discoloration properties of the polymeric compositions containing no such additives.

HINDERED PHENOLS

The principal stabilizing agent incorporated into the polymer composition of this invention consists of a phenolic compound which can be characterized as a hindered phenol. The hindered phenols useful in this invention can be described as containing one or more phenol configurations

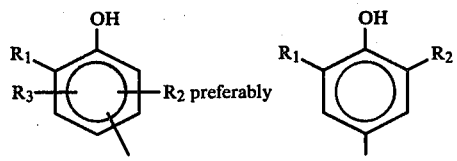

wherein $R_1$, $R_2$, $R_3$ which can be the same or different are hydrocarbyl radicals having 1 to 12 carbon atoms. Generally, the hindered phenols will contain 1 to 6 of such configurations, the 3,5-dihydrocarbyl-4-hydroxyphenyl being most preferred; compounds wherein $R_1$ and $R_2$ are alkyl and particularly tert.-alkyls are useful. The phenol configuration is attached to hydrogen or an organic moiety compatible with the polymer and contributing essentially no coloration to the polymer; the organic moiety will also be compatible with the mixing and blending operation and with the use of the mixture. Examples for such organic moieties are hydrocarbyl radicals, which are either unsubstituted or substituted by hydroxy and/or alkanoyloxy groups; ester configurations; cyanurate and isocyanurate configurations; and phosphonate radicals.

Examples of such phenolic stabilizers follow.

One group of hindered phenolic stabilizers of interest in this invention can be represented by the formula:

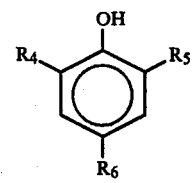

Wherein $R_4$ and $R_5$ can be the same or different, each representing tertiary alkyl, cycloalkyl, aryl and alkylaryl radicals containing from 4 to about 10 carbon atoms and $R_6$ is a hydrogen atom or an alkyl group containing from 1 to about 4 carbon atoms. Specific examples of suitable compounds include 2,6-di-t-butyl-4-ethylphenol, 2,6-dicyclopentylphenol, 2,6-dicyclooctyl-4-methylphenol, 2-t-butyl-4-methyl-6-cyclohexylphenol, 2,6-dibenzyl-4-n-butylphenol, 2,6-di(1-naphthyl)-phenol and mixtures.

Another group of hindered phenolic stabilizers of interest in this invention are the esters of hindered hydroxybenzoic acids and hindered hydroxyphenylakanoic acids which can be represented by the formulae:

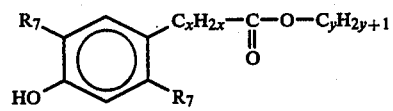

in which the radicals $R_7$ which can be the same or different are alkyl radicals containing from 1 to about 6 carbon atoms, x is an integer of 0 to 6, and y is an integer of 6 to 30 and

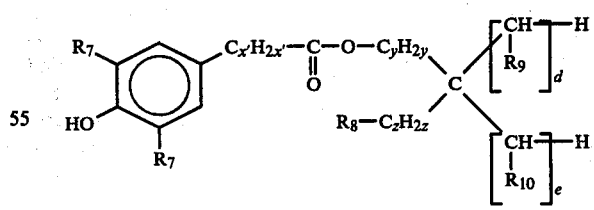

in which $R_8$ is hydrogen, hydroxy, alkanoyloxy or

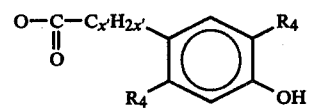

each of $R_9$ and $R_{10}$ is hydroxy, alkanoyloxy or

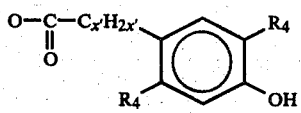

and $R_7$ is as defined above, x' an integer of 1 to 6, each of y', z, d and e independently has a value of 0 to 6, at least one of y', z, d and e have a value other than 0 and the sum of d and e being no greater than 6 and being at least 1 when $R_8$ is hydrogen and the sum of y' and z being at least 1 when $R_8$ is other than hydrogen.

Examples of specific compounds of formulae A and B include n-hexyl, 3,5-di-t-butyl-4-hydroxyphenylbenzoate, n-octadecyl 3,5-di-t-butyl-4-hydroxyphenylacetate, n-octadecyl 3-(3,5-di-t-butyl-4-hydroxyphenyl)propionate, ethyl alpha-(4-hydroxy-3,5-di-t-butylphenyl)isobutyrate, ethylene glycol bis(3,5-di-t-butyl-4-hydroxyphenylacetate), 2-stearoyloxyethyl 7-(3-methyl-5-t-butyl-4-hydroxyphenyl)heptanoate and tetrakis[methylene 3-(3,5-di-t-butyl-4-hydroxyphenyl) propionate]methane which has also been alternately named as tetrakis [methylene (3,5-di-t-butyl-4-hydroxy-hydrocinnamate)]methane. Descriptions of these compounds and their preparation are disclosed in U.S. Pat. No. 3,285,855.

Examples of commercially available phenolic stabilizers are tetrakis[methylene(3,5-di-t-butyl-4-hydroxyhydrocinnamate)]-methane (commercially available as Irganox® 1010)

n-octadecyl[3-(3,5-di-t-butyl-4-hydroxyphenyl)propionate (commercially available as Irganox® 1076)

di-n-octadecyl (3,5-di-t-butyl-4-hydroxybenzyl)phosphonate (commercially available as Irganox® 1093)

tris(3,5-di-t-butylhydroxybenzyl)isocyanurate (commercially available as Goodrite® 3114)

1,3,5-trimethyl-2,4,6-tris(3,5-di-t-butyl-4-hydroxybenzyl) benzene (commercially available as Ethyl® 330)

The presently preferred phenolic stabilizer is 2,6-di-t-butyl-4-methylphenol.

The hindered phenols are present in the composition of this invention preferably in a quantity of 0.002 to about 0.2 parts by weight based on 100 parts by weight of polyolefin.

The polymer composition of this invention can contain other additives such as fillers. As pointed out above, it is presently preferred to have no phosphite or diphosphite present in the composition of this invention. The phosphite is an effective discoloration inhbiting agent but sometimes poses the problems of black specks pointed out above. Therefore, the preferred composition in accordance with this invention contains the glycerides as the discoloration prevention agent but no organic phosphites such as diphosphites.

The following examples are intended to further illustrate the invention without undue limitation of the scope.

The color characterstics of polymer samples is determined by compression molding of discs $\frac{1}{4} \times 2\frac{1}{4}$ inches (0.6×5.7 cm) at 163° C. The tristimulus values L, a, b of these samples are measured on a Hunter Laboratory Color Difference Meter Model 25 DM. The b value is representative of the yellow color of the sample. An increase in the numerical value determined for b represents an intensification of the yellow color. The "color number" is calculated by the following formula from the three values L, a, b:

Color number=$L(0.0382L-0.056a-0.3374b)$. The higher the "color number" the less intense is the color.

EXAMPLE 1

The commercially available polyethylene resin used in this example had a melt index of 0.8 and a density of 0.942 g/cc. It was made using a catalyst of 2 wt. percent chromium oxide supported on silica-titania cogel. The titanium content of the silica-titania cogel is about 2.5 wt %. The resin had a nominal chromium content of about 3 ppm and a nominal titanium content of about 5 ppm based on analysis of a sample of ashed polymer. The polyethylene was mixed in a Waring Blender with the additives shown in the following table and the mixture obtained was mixed in a Brabender Plastograph at 185° C., the compression molded into $\frac{1}{4}$ inch thick discs. The quantities of additives shown in the following table are given in parts by weight based on 100 parts by weight of the polyethylene. The Hunter color values indicate coloration, 0 being colorless and positive values for the Hunter value "b" referring to yellow color. Negative values of the Hunter color "a" values indicate green color.

The following table shows the additives as well as the Hunter color tests results.

TABLE 1

| Run | BHT[1] | DLTDP[2] | DSPD[3] | GMS[4] | TNPP[5] | L[6] | a | b |
|-----|--------|----------|---------|--------|---------|------|------|------|
| 1 | .05 | | | | | 80.7 | −1.2 | 2.6 |
| 2 | .05 | .03 | | | | 78.1 | −1.5 | 2.8 |
| 3 | .05 | .03 | | .01 | | 81.4 | −1.8 | 1.3 |
| 4 | .05 | .03 | | .05 | | 81.6 | −1.7 | 0.8 |
| 5 | .05 | .03 | | .10 | | 81.3 | −1.6 | 0.7 |
| 6 | .05 | .03 | .01 | | | 81.9 | −1.7 | 0.4 |
| 7 | .05 | .03 | .05 | | | 81.8 | −1.3 | 0 |
| 8 | .05 | .03 | .10 | | | 81.7 | −1.3 | 0.3 |
| 9 | .05 | .03 | | | .01 | 80.8 | −2.0 | 1.9 |
| 10 | .05 | .03 | | | .05 | 80.8 | −2.0 | 1.9 |
| 11 | .05 | .03 | | | .10 | 81.5 | −2.4 | 3.3 |

[1]2,6-di-t-butyl-4-methylphenol.
[2]Dilauryl thiodipropionate.
[3]Distearyl pentaerythritol diphosphite.
[4]Commercial glyceride product, Atmos 150, ICI. It is a monoglyceride diglyceride mixture of edible fats having a HLB of 3.2 and containing 62 weight % of monoglycerides, 1.5 weight % water and 1.5 weight % of glycerol.
[5]Trisnonylphenyl phosphite
[6]L is a value related to whiteness on the Hunter Instrument with 0 referring to black and 100 to white.

The above results show that the glyceride mixture at very low concentrations is already an effective discoloration stabilizer. The discoloration properties are significantly improved over compositions containing no discoloration stabilizer at all and are also significantly improved over compositions containing an additive, namely TNPP which ordinarily improves the color properties but in this particular environment did not. Whereas the additive DSPD does achieve a very good stabilization agent discoloration this additive as pointed out may cause other problems not envisaged with the discoloration stabilizer of the present invention.

EXAMPLE 2

In a similar procedure as described in Example 1 a polyethylene powder (Marlex 4903, having a melt index of 0.4, a density of 0.948 g/cc, and having some 1-hexene copolymerized with the ethylene; manufactured by Phillips Petroleum Company) was mixed in a Waring Blender with the additives listed in the following table. The polymer contained 2 ppm of chromium and 3 ppm of titanium. The mixture was extruded at 450° F. and molded into discs for the Hunter color test. The results are also shown in the following table 2:

TABLE 2

| | ADDITIVE WEIGHT % | | | | | | | |
|---|---|---|---|---|---|---|---|---|
| Run No. | BHT | DLTDP | IRGANOX 1010* | GMS | Color No. | L | a | b |
| 12 | .05 | .03 | | | 232 | 84.2 | −2.0 | 1.7 |
| 13 | .05 | .03 | | .005 | 251 | 84.6 | −1.8 | 1.1 |
| 14 | .05 | .03 | | .010 | 278 | 85.2 | −1.8 | 0.3 |
| 15 | .05 | .03 | | .025 | 276 | 85.2 | −1.8 | 0.3 |
| 16 | .05 | .03 | | .050 | 285 | 85.2 | −0.8 | 0.0 |
| 17 | .15 | | | | 248 | 84.9 | −0.9 | 1.3 |
| 18 | .15 | | | .050 | 289 | 85.3 | −1.7 | −.1 |
| 19 | | | .050 | .050 | 263 | 85.2 | −1.9 | 0.8 |
| 20 | | | .050 | .050 | 274 | 85.2 | −1.7 | 0.3 |

*Tetrakis methylene(3,5-di-butyl-4-hydroxyhydrocinnate)methane for other abbreviations see footnotes on table 1.
These data show the improvement in color number and b-value achieved by this invention.

EXAMPLE 3

The thermal stability of a phosphite stabilizer and of a glyceride, each alone and each mixed in a 50/50 weight ratio with a sample of the polymer of example 2 was determined by placing a portion in a test tube, heating the test tube to 550° F. and maintaining that temperature for 1 hour. The results are shown in the following table 3.

TABLE 3

| Run No. | | Observation |
|---|---|---|
| 21 | Phosphite* | Within 10 minutes decomposition started with bubbling and formation of black char residue on surface and side of test vial. After 60 minutes complete |

TABLE 3-continued

| Run No. | | Observation |
|---|---|---|
| | | charring occurred. |
| 22 | Atmos 150** | After 60 minutes sample was liquid and slightly yellow, but no black product was observed. |
| 23 | 50/50 Polymer-Phosphite Blend | After 60 minutes the product was cloudy and a large amount of black product had accumulated on the wall of the test vial. |
| 24 | 50/50 Polymer Atmos 150 Blend | After 60 minutes the product was yellow with some yellow liquid deposited on the wall. |

*Distearyl pentaerythritol disphosphite.
**See footnotes Table 1.

These results demonstrate the desirable features achieved by this invention on the undesirability of phosphites in the polymer compositions.

EXAMPLE 4

A series of blends of polypropylene and various levels of a glyceride product were made in the following manner. A slurry of 35 grams of polypropylene in acetone together with the additives was prepared, dried and mixed in a Plastograph at 185° C. for 10 minutes under nitrogen and at 50 rpm. This composition was then molded into discs of 2½ × ¼ at a temperature of 425° F. (218° C.) for 5 minutes. Color measurements on these discs were made with a Hunter Color meter Model D25M-9). The polypropylene used was a homopolymer having approximately the following properties:

| Melt Flow | 4 |
|---|---|
| Flexural Modulus | 210,000 psi |
| Density | 0.90 g/cc |

The additives as well as the results of the color measurement for the various runs are shown in the following table.

TABLE 4

| | Additives, wt. % | | | | | Tristimulus Color Values | | | Yellowness Index |
|---|---|---|---|---|---|---|---|---|---|
| Run No. | BHT[2] | Glycerol Mono Stearate[1] | DLTDP[2] | Topanol CA[3] | Ethanox 330[4] | L | a | b | YI-1 |
| 25 | 0 | 0 | | | | 72.3 | −2.5 | 8.3 | 17.9 |
| 26 | 0.13 | — | | | | 70.3 | −2.2 | 5.9 | 12.9 |
| 27 | 0.13 | 0.010 | | | | 71.8 | −2.2 | 4.4 | 9.0 |
| 28 | 0.13 | 0.025 | | | | 71.3 | −1.8 | 3.5 | 7.2 |
| 29 | 0.13 | 0.050 | | | | 72.3 | −1.6 | 2.5 | 4.9 |
| 30 | 0.13 | — | 0.30 | | | 71.9 | −2.4 | 4.6 | 9.3 |
| 31 | 0.13 | 0.010 | 0.30 | | | 71.8 | −2.1 | 3.7 | 7.4 |
| 32 | — | | | 0.10 | | 64.6 | −3.8 | 20.2 | 52.0 |

TABLE 4-continued

| Run No. | Additives, wt. % | | | | | Tristimulus Color Values | | | Yellowness Index YI-1 |
|---|---|---|---|---|---|---|---|---|---|
| | BHT[2] | Glycerol Mono Stearate[1] | DLTDP[2] | Topanol CA[3] | Ethanox 330[4] | L | a | b | |
| 33 | | 0.010 | | 0.10 | | 65.9 | −3.5 | 16.9 | 42.3 |
| 34 | | — | | | 0.10 | 71.1 | −4.2 | 11.6 | 25.2 |
| 35 | | 0.010 | | | 0.10 | 69.9 | −3.3 | 10.8 | 24.6 |

[1]Glycerol mono stearate: Atmos 150, ICI Americas, Lot 635D.
[2]See Table 1 for the meaning of these abbreviations.
[3]1,1,1-tris(2-methyl-4-hydroxy-5-t-butylphenyl)butane.
[4]1,3,5-trimethyl-2,4,6-tris(3,5-di-t-butyl-4-hydroxybenzyl)benzene.

The test data from the table show that the addition of the glyceride at the low level significantly improves the color of polypropylene e.g., from a value for b=5.9 to a b value as low as 2.5 when BHT is used. The small amount of glycerides is also effective when used in the presence of DLTDP which is co-stabilizer and color suppressor in itself. Furthermore, low amounts of the glyceride are effective in the presence of highly active antioxidants such as Topanol CA and Ethanox 330 which give color problems, but are used because of their activity and retention in polymer in rigorous uses.

Reasonable variations and modifications which will become apparent to those skilled in the art can be made in this invention without departing from the spirit and scope thereof.

I claim:

1. Composition of matter comprising a mixture of
   (a) 100 parts by weight of an ethylene polymer having 0 to 10 molecular percent of a comonomer selected from the group of olefins of 3 to 8 carbon atoms, said polymer containing Ti as catalyst residue,
   (b) 0.002 to 0.2 parts by weight of a phenolic stabilizer,
   (c) 0.001 to less than 0.05 parts by weight of one or more glycerides of fatty acids, said glycerides reducing the discoloration effects occurring within the composition,
   said composition being free of organic phosphite.

2. Composition in accordance with claim 1 wherein said polymer is one that has been obtained by polymerizing predominantly ethylene with a supported chromium oxide catalyst.

3. Composition in accordance with claim 2 wherein said chromium catalyst is supported on a silica-titania cogel carrier.

4. Composition in accordance with claim 1 wherein said polymer contains from about 1 to 10 ppm titanium catalyst residue calculated as the metal.

5. A process for color stabilization of titanium containing ethylene polymer having 0 to 10 molecular percent of a comonomer selected from the group of olefins of 3 to 8 carbon atoms, said polymer containing Ti as catalyst residue, comprising admixing with said polymer a stabilizing amount of a glyceride of a fatty acid, said polymer being free or organic phosphite.

6. A process in accordance with claim 5 wherein said polymer also contains a phenolic stabilizer.

7. Composition of matter comprising a mixture of
   (a) 100 parts by weight of polypropylene, said polypropylene containing Ti as catalyst residue,
   (b) 0.002 to 0.2 parts by weight of a phenolic stabilizer,
   (c) 0.001 to less than 0.05 parts by weight of one or more glycerides of fatty acid, said glycerides reducing the discoloration effects occurring within the composition,
   said composition being free of organic phosphite.

8. Composition in accordance with claim 7 wherein said polypropylene is one that has been obtained by polymerizing predominantly propylene with a titanium based coordination catalyst.

9. Composition in accordance with claim 7 wherein said polypropylene contains from about 1 to 10 ppm titanium catalyst residue calculated as the metal.

10. A process for color stabilization of titanium containing polypropylene, said polymer containing Ti as catalyst residue, comprising admixing with said polymer a stabilizing amount of a glyceride of a fatty acid, said polypropylene being free of organic phosphite.

11. A process in accordance with claim 10 wherein said polypropylene also contains a phenolic stabilizer.

* * * * *